Aug. 29, 1967     R. B. BLODGETT     3,339,007
POWER CABLES WITH AN IMPROVED MOISTURE BARRIER
Filed July 28, 1965                    2 Sheets-Sheet 1

INVENTOR
ROBERT B. BLODGETT
BY
Frank E. Robbins
ATTORNEY

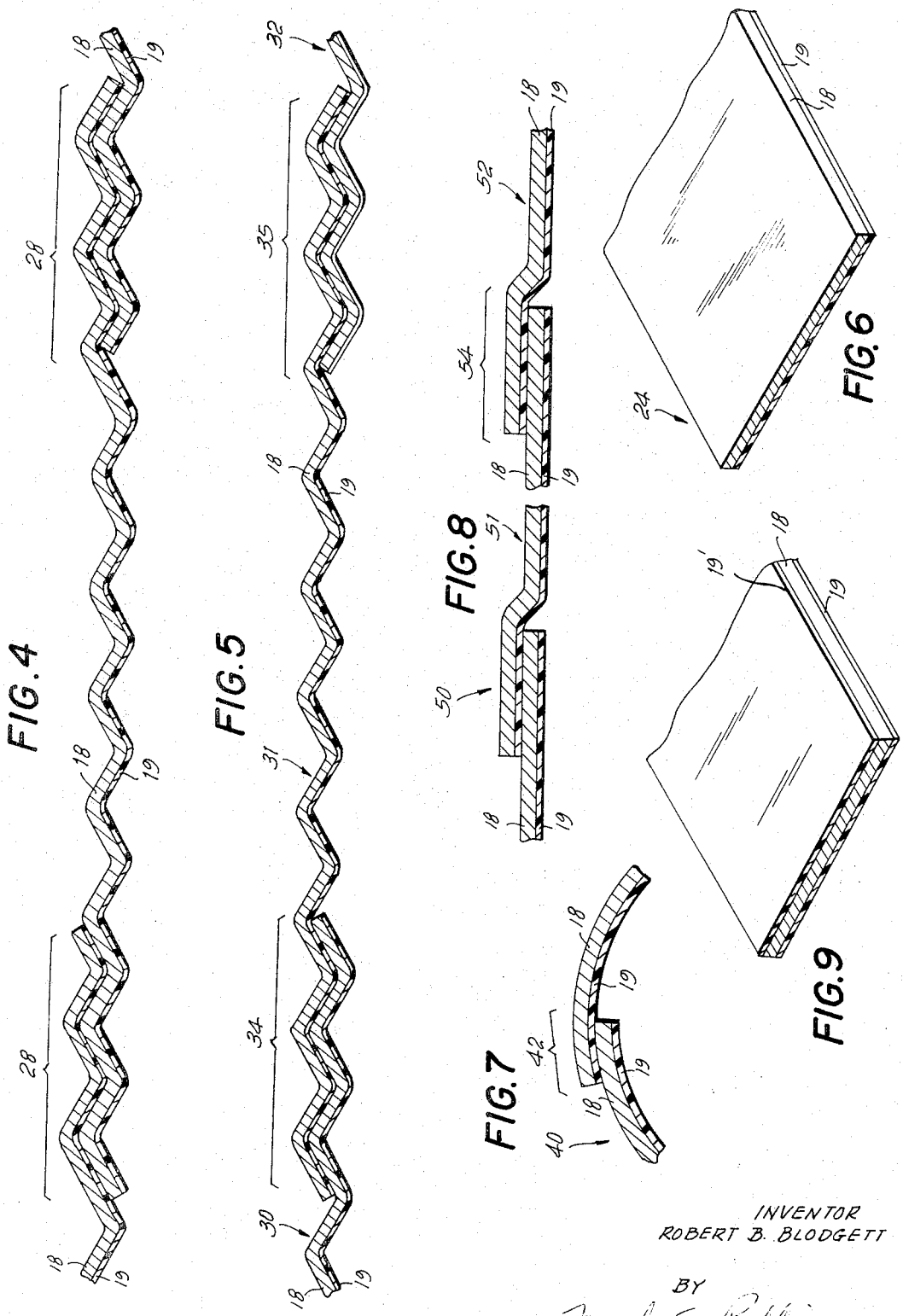

United States Patent Office 3,339,007
Patented Aug. 29, 1967

3,339,007
POWER CABLES WITH AN IMPROVED MOISTURE BARRIER
Robert B. Blodgett, Ridgewood, N.J., assignor to The Okonite Company, Passaic, N.J., a corporation of New Jersey
Filed July 28, 1965, Ser. No. 475,379
1 Claim. (Cl. 174—25)

This invention relates generally to electric cable constructions. More particularly, this invention relates to an improved construction for an electric power cable that provides protection for a water-sensitive insulation, such as, for example, oil-impregnated paper. Still more particularly, the invention relates, in one of its embodiments, an improved construction for an electric power cable that has advantageous characteristics suiting it for aerial installation.

Electric power cable is subjected to relatively rapid internal temperature changes, due to load changes, so that the temperature differential, between the interior of the cable and ambient temperature of its environment, may be great in magnitude and frequency. By comparison, the differential is much less for telehpone cable, since telephone cable operates essentially at ambient temperature, and therefore is subjected only to changes in ambient temperature.

The temperature changes caused by operating load changes, and ambient temperature changes, subject the cable to sequential and irregular expansion and contraction. The pressure within the cable therefore varies between relatively high pressures and relatively low pressures. This variation affords an opportunity for moist air to be drawn into the cable, and, as is well known, the presence of moisture, water vapor, and oxygen are deleterious. It has been an object of cable design to prevent access of these harmful elements to the cable.

One way to prevent access of these elements to the cable is by providing an impervious metal sheath, such as a lead sheath. The use of lead sheaths has gradually decreased, not only because of the weight factor, but also because lead is subject to corrosion and to cracks from fatigue and stress. In place of lead sheathing, the so-called Alpeth and Stalpeth sheaths have been used.

An Alpeth sheath consists of a corrugated, longitudinally folded, electrically conductive metal strip that encases the cable core, and that in turn is covered and protected by a polyethylene jacket. Such a sheath provides good protection for the cable core, but over long periods of time, is not completely impervious to the penetration of moisture, and for this reason, the Alpeth sheath construction ordinarily is used today only for polyethylene insulated cable.

A Stalpeth sheath construction may consist of a corrugated, longitudinally folded aluminum sheath, that is disposed to have a gap between its confronting edges, and that encases the cable core, and over which a corrugated, longitudinally folded steel sheath is applied. The steel sheath is disposed to have its edge portions overlapped, and the overlapped portions are soldered together, to form a substantially impervious barrier. Unfortunately, there are occasional pinhole imperfections in the soldered joint, and for this reason, nitrogen under pressure is frequently employed when the risk of moisture penetration, that is occasioned by the presence of pinholes, must be minimized.

Moreover, the use of such a construction for a high voltage power cable has the disadvantage that the changes in temperature, particularly alternate heating and cooling, produce cracking tendencies at the seam.

More recently, welded steel outer sheaths have been developed. One such sheath construction employs an inner strip of highly conductive material and an outer steel strip. These strips are bonded together over major portions of their confronting, engaged faces, and have been simultaneously corrugated after bonding. These united strips are folded, as a unit, longitudinally over the core, but with a gap between the edges of the inner strip, and with the edges of the outer strip overlapped at the gap, and welded together. Such constructions may also suffer from occasional pinhole defects along the welded bond, and in practice, have been found to be suitable primarily for small conductor, low power telephone cables. Such constructions are not completely satisfactory for power cables because of relatively high loss.

One object of the present invention is to provide a new and improved practical construction for an electrical cable.

Another object of the invention is to provide a new, practical construction for an electrical power cable, that is resistant to the penetration of moisture into the cable under cyclic electrical loading conditions.

A related object of the invention is to provide a cable construction of the character described, that can be light in weight, and also free from the undesirable susceptibility to corrosion and fatigue cracking that characterizes lead-sheathed cable.

A more specific object of the invention is to provide a cable of new and practical design, that has highly effective resistance to the penetration to the interior of the cable of oxygen, water, and water vapor.

Another specific object of the invention is to provide a new and practical construction for an electrical cable, that will effectively protect a moisture-sensitive insulation against the penetration of moisture.

A further object of the invention is to provide a new and practical electrical cable construction that is particularly suitable for aerial installation.

Other objects of the invention will be apparent hereinafter from the specification and from the recital of the appended claim.

In the drawings:

FIG. 4 is a fragmentary section, on an enlarged scale, taken in a direction lengthwise of the cable, and showing in greater detail the arrangement of the sheath of the cable section shown in FIG. 2;

FIG. 5 is a fragmentary sectional view, similar to the view shown in FIG. 4, but showing a sheath construction in accordance with a modified embodiment of the invention;

FIG. 6 is a fragmentary, perspective, transverse section of a unitary laminate of a metallic strip and a polymeric layer, for use in making a sheath for an electric cable in accordance with the present invention;

FIG. 7 is a fragmentary transverse section showing a sheath construction in accordance with the present invention, where the sheath is formed with a single, overlapped, lengthwise seam;

FIG. 8 is a fragmentary section, taken in a direction lengthwise of the cable, and showing a sheath construction in accordance with the present invention, where the sheath is formed from a laminate of the kind shown in FIG. 6, that is wound helically about the cable core, and FIG. 9 is a fragmentary, perspective, transverse section of a unitary laminate of a metallic strip and a pair of polymeric layers that are applied and bonded, respectively, to the two faces of the metallic strip, for use in making a sheath for an electric cable in accordance with a modified embodiment of the present invention.

While the invention is of general applicability to electric cable construction, including rubber insulated cable as well as oil impregnated, paper insulated cable, the drawings illustrate the invention in connection with a single conductor, oil impregnated, paper insulated cable. However, it should be understood that this is for purposes of illustrating and explaining the invention only.

Figure 1:
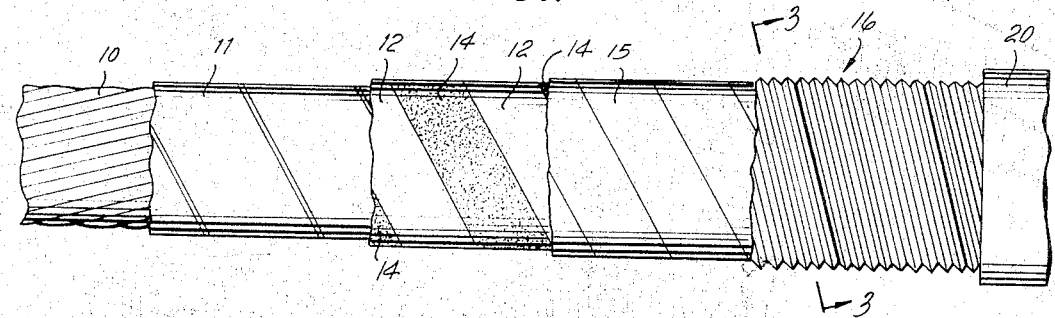
FIG. 1 is a fragmentary side elevation of a cable that is constructed in accordance with one preferred embodiment of the invention, with parts broken away at different levels, better to illustrate the cable construction.
Figure 2:
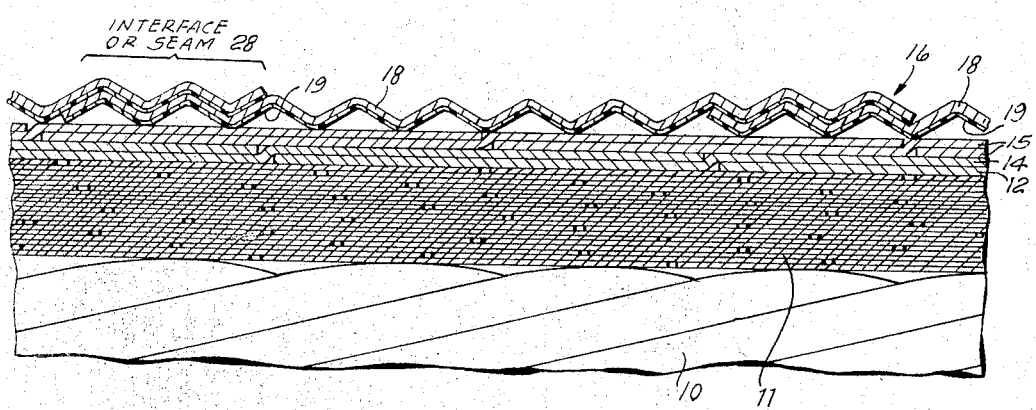
FIG. 2 is a fragmentary longitudinal section thereof, on an enlarged scale, partly broken away.
Figure 3:
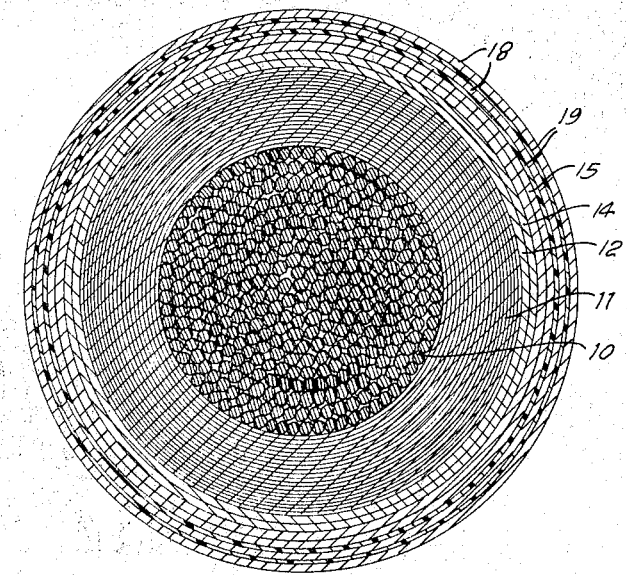
FIG. 3 is a transverse section taken on the line 3—3 of FIG. 1, looking in the direction of the arrows.

Referring now in detail to the drawings by numerals of reference, and particularly to FIGS. 1 through 3, the numeral 10 denotes collectively a metallic stranded conductor. The conductor 10 is insulated by helical wrappings 11 of paper tape that is oil impregnated and that is applied in a suitable thickness for the intended operating voltage. Intercalated, helically wound, overlapped windings of copper tape 12 and of electrically conductive, carbon-impregnated tape 14 are applied over the paper insulation 11, and can be grounded to provide a shield for the cable. Two tapes 15, of a metallized plastic film, such as, for example, an aluminized polyethylene terephthalate, are wrapped helically about the shield, in overlapped fashion, for the primary purpose of containing the oil in the paper insulation.

A sheath, that is designated by the general numeral 16, is applied about the core that consists of the conductor 10, the oil impregnated paper insulation 11, the shield provided by the alternating windings of copper tape 12 and of carbon tape 14, and the wrapping of metallized plastic 15. The sheath 16 is formed from a laminate of a metallic strip 18 and a polymeric layer 19. The laminate was corrugated upon application about the cable core. The corrugated laminate is helically wound about the cable core, with at least one and preferably multiple nesting overlaps at each winding. In the illustrated, preferred embodiment of the invention, there are ten "peaks" in the corrugations across the width of the laminate, and an overlap of two and one-half corrugations along each margin of the laminate. The sheath 16 is encased within a jacket 20 of a substantially moisture-impervious material such as, for example, polyethylene or rubber, suitable for withstanding the effects of weather and of installation.

The sheath 16, in accordance with the illustrated preferred embodiment of the invention, is formed from a unitary, flat laminate 24 (FIG. 6), that consists of a metallic strip 18 that is completely covered on one face by a polymeric layer 19 that is applied and bonded thereto. In accordance with this preferred embodiment of the invention, the polymeric layer 19 is a heat-activatable material, that can be activated to bond adherently to a confronting surface against which it is engaged.

Thus, referring particularly to FIGS. 2 and 4, the polymeric layer 19, in the corrugated sheath structure, is bonded by heat activation or fusing, to the underlying, confronting surface portions of the metallic strip 18, at each interface or seam 28 that is formed by the overlapped portions of the helical windings of the corrugated laminate. Although the heat activation can be accomplished in a variety of ways, it is preferred that the polymeric material be selected so that it can be heat activated upon extrusion of the jacket 20 about the sheath, so that a separate heat activation step is not necessary.

In this preferred embodiment of the invention, the polymeric layer should be formed from a material that not only is heat-activatable to bond to underlying surface portions of the metal strip 18, or other surface, it should also be water-resistant, oil-resistant, and resistant to the passage of water vapor and oxygen therethrough. One satisfactory material for the manufacture of the polymeric layer is a heat-sealable formulation including chlorosulfonated polyethylene. Thicknesses as low as about ten mils have been found to be satisfactory for the polymeric layer.

Other resinous materials, for making the polymeric layer, include polyethylene-polypropylene copolymers, and composite films, such as one that consists of a polyester base film that is covered on each of its faces with a film of a different polymer that is heat-activatable for bonding to the metal, such as, for example, polyethylene, or a polyethylene-polypropylene copolymer.

For good resistance to corrosion, and for optimum bonding to chlorosulfonated polyethylene, tin-plated copper strip is preferred for use as the metallic strip material in the sheath, but other metallic materials can also be used, such as, for example, steel, aluminum and brass.

The sheath construction of the present invention has several advantages. One of the more important advantages is that the bonded seams form seals, between successive windings of the sheath, that keep out water, water vapor and oxygen. This is particularly important for oil impregnated, paper insulated cable, which is very sensitive to moisture and to oxygen. As is well known, moisture tends to increase the power factor of the cable by hydrating the cellulose, so that dielectric loss becomes undesirably high, and oxygen tends to produce the same result by attacking the insulating oil.

Moreover, the use of an intercalated bond tends to prevent creep of the convolutions of the metal strip portion of the sheath. The helically overlapped metal tape is better able to withstand internal pressure due to cyclic loading because the metal tape withstands the tension and the sealing medium is in compression only whereas internal cable pressure places the seal in tension or shear in other methods. Still another advantage is that a sheath structure in accordance with the present invention ordinarily is less expensive than a comparable sheath construction that involves metallic bonding as by soldering or welding.

One of the important features of a sheath construction, in accordance with the present invention, that is productive of many of the advantages mentioned above, is the broad area of contact between the polymeric layer and the underlying portion of the metal strip against which it is engaged and to which it is bonded and sealed, at each seam in the sheath structure. Since the metal tape is impervious to radial penetration of liquids or gas, these fluids can only pass between the overlaps. The rate of passage is directly proportional to cross-sectional area, but inversely proportional to width of the overlap. By proper device of polymer combined with a longitudinal width of the overlap adjusted to be many times the radial thickness of the non-metallic seal, penetration of fluids is made negligible. The broad bonding area also imparts desirable mechanical characteristics.

In the modified embodiment of a sheath construction, in accordance with the invention, that is illustrated in FIG. 5, a different overlapping technique has been employed. Three adjacent convolutions of the sheath, 30, 31, and 32, respectively, are shown, the center convolution 31 being shown in full section, while only fragmentary marginal portions of the convolutions 30 and 32 are shown. The convolutions 30 and 32 are applied about the cable core with a gap spacing between them, and the center convolution 31 is applied over the gap, so that it overlaps the two other convolutions at each of its ends. This produces an interface or seam 34, at the overlap of the convolution 31 over the convolution 30, and an interface or seam 35 where the convolution 31 overlaps the convolution 32. Both interfaces or seams are bonded. Thus, all of the advantages of the improved structure in accordance with the present invention are obtained.

The invention can also be embodied in a sheath that is applied to have a longitudinal seam. As shown in transverse section in FIG. 7, the sheath 40 is formed by the application of the flat laminate about the cable core (not shown), with a single, overlapped longitudinal seam 42, that is bonded by adhesion of the polymeric layer 19 against the underlying portion of the metal strip 18, across the width of the seam 42.

The invention can also be embodied in a cable construction in which the sheath is applied as a helical winding of the flat laminate, as shown in FIG. 8. There the sheath has several successive convolutions, one of which is identified as the convolution 51, and a second as the convolution 52. The convolution 52 is applied with a marginal portion thereof overlapping the underlying end portion of the convolution 51, to provide a helical seam 54. The polymeric layer 19 is bonded to the underlying surface portion of the metal strip 18, across the entire width of the seam 54.

In each of the embodiments of the invention that have been illustrated and described, the laminate 24 has been formed from a single metallic strip that is covered or coated on one of its faces with a polymeric layer of a heat-activatable material. Moreover, in each of the illustrated and described cable constructions, the polymeric layer of the sheath has been disposed to face internally. However, the polymeric layer, if single, could be disposed to face externally as well as internally, within the scope of this invention. Moreover, the polymeric layer may be applied over and bonded to both faces of the metallic strip, as shown, for example, in FIG. 9, where the numeral 19' designates the second polymeric layer.

Additional advantages are obtained when the polymeric layer is applied to both surfaces of the metallic strip. For example, in the manufacturing process, either side of such a laminate can be used indiscriminately, whereas, with a single polymeric layer in the laminate, as in FIG. 6, care must be exercised in the manufacturing process to have the polymeric side disposed uniformly, always either internally or externally of the cable. Another advantage of having polymeric layers on both sides of the metal strip is that, when the polymeric layer is heat-activated, a bond is produced between the sheath and the outer jacket, and this is advantageous for many applications.

The invention has been described herein as an electrical cable with a novel, advantageous sheath structure. It will be readily understood by those skilled in the art, however, that the novel sheath construction can be made to serve an electrical function as well as a mechanical function, in some embodiments thereof, if the metallic strip is grounded, so that it can function as a shield. In such a case, the polymeric layer or layers would be selected to be semiconductive, for electrical design purposes.

While some of the materials, that can be used in making a sheath in accordance with the present invention, make it desirable to have a bond at each seam, between the polymeric layer and the confronting, engaged portion of the metallic strip, nevertheless, for some applications, a snug mechanical engagement will suffice. For example, when the polymeric layer of the laminate is a layer of resilient rubber that has been calendered onto the metal strip, the resilient rubber layer will conform to the shape of the metallic strip, and if the sheath is applied as in normal manufacturing practice, or perhaps with even greater tension, the snug engagement at each seam will prevent penetration of undesirable elements into the cable. Moreover, this embodiment of the invention permits relative displacement between adjacent convolutions of the sheath and thus enhances the flexibility of the cable. Where the polymeric layer is an elastomeric layer, that is employed for resilience and shape conformity, rather than for bonding, a layer thickness on the order of about 10 mils has been found to be highly satisfactory.

While the invention has been disclosed herein by reference to certain preferred embodiments thereof, it is to be understood that this disclosure is intended in an illustrative, rather than in a limiting sense, and it is contemplated that various modifications in the construction and arrangement of the parts will readily occur to those skilled in the art, within the spirit of the invention and the scope of the appended claim.

I claim:

An electric cable construction comprising a core that includes a metallic conductor and oil-impregnated insulation, and a barrier sheath that is disposed about said core and that is formed from a metallic strip and a layer of neoprene that is applied over and bonded to at least one face of the metallic strip to form a unitary laminate, said laminate being disposed as a continuous stratum about said core, said stratum comprising at least a single thickness of said laminate and including overlapped portions with at least two thicknesses of the laminate, said neoprene layer being disposed to confront and engage a surface of the cable core and mechanically engaging the confronting marginal portions of the metallic strip when the laminate is overlapped to form a resilient seal between said marginal portions, said metallic strip being remote from the cable core.

References Cited

UNITED STATES PATENTS

| 2,937,665 | 5/1960 | Kennedy | 174—108 X |
| 2,960,561 | 11/1960 | Plummer | 174—36 |
| 3,130,256 | 4/1964 | Mildner | 174—107 X |
| 3,206,541 | 9/1965 | Jachimowicz | 174—107 X |
| 3,233,036 | 2/1966 | Jachimowicz | 174—107 |
| 3,244,799 | 4/1966 | Roberts | 174—107 |

FOREIGN PATENTS

| 1,065,299 | 1/1954 | France. |
| 510,190 | 7/1939 | Great Britain. |
| 577,888 | 6/1946 | Great Britain. |
| 597,957 | 2/1948 | Great Britain. |
| 704,096 | 2/1954 | Great Britain. |
| 942,730 | 11/1963 | Great Britain. |
| 944,365 | 12/1963 | Great Britain. |
| 968,061 | 8/1964 | Great Britain. |

LEWIS H. MYERS, *Primary Examiner.*

H. HUBERFELD, *Assistant Examiner.*